United States Patent
Bolshinsky et al.

(10) Patent No.: US 10,628,510 B2
(45) Date of Patent: Apr. 21, 2020

(54) WEB LINK QUALITY ANALYSIS AND PREDICTION IN SOCIAL NETWORKS

(71) Applicant: International Business Machines Corporation, Armonk, NY (US)

(72) Inventors: Leonid Bolshinsky, Karmiel (IL); Vladimir Gamaley, Rehovot (IL); Sharon Krisher, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 947 days.

(21) Appl. No.: 15/198,176

(22) Filed: Jun. 30, 2016

(65) Prior Publication Data

US 2018/0004855 A1 Jan. 4, 2018

(51) Int. Cl.
*G06F 16/955* (2019.01)
*G06F 16/9536* (2019.01)
*G06F 16/958* (2019.01)
*G06F 17/22* (2006.01)

(52) U.S. Cl.
CPC ........ *G06F 16/9558* (2019.01); *G06F 16/958* (2019.01); *G06F 16/9536* (2019.01); *G06F 16/986* (2019.01); *G06F 17/2235* (2013.01); *G06F 17/2247* (2013.01)

(58) Field of Classification Search
None
See application file for complete search history.

(56) References Cited

U.S. PATENT DOCUMENTS

| | | | |
|---|---|---|---|
| 6,519,616 B1 | 2/2003 | Zamora-McKelvy et al. | |
| 6,601,066 B1 | 7/2003 | Davis-Hall | |
| 9,183,259 B1 | 11/2015 | Marra et al. | |
| 2002/0087326 A1 | 7/2002 | Lee et al. | |
| 2006/0136294 A1 | 6/2006 | Linden et al. | |
| 2007/0067297 A1* | 3/2007 | Kublickis | G06Q 30/02 |
| 2009/0164323 A1 | 6/2009 | Byrne | |
| 2014/0229234 A1 | 8/2014 | Yan et al. | |
| 2016/0188543 A1* | 6/2016 | Glover | G06F 17/2235 |
| | | | 715/208 |

FOREIGN PATENT DOCUMENTS

KR 1020150070835 A 6/2015

* cited by examiner

*Primary Examiner* — James Trujillo
*Assistant Examiner* — John J Morris
(74) *Attorney, Agent, or Firm* — Brian M. Restauro; William H. Hartwell

(57) ABSTRACT

Embodiments of the present invention provide methods, computer program products, and systems for web link quality analysis. Embodiments of the present invention can be used to receive a first indication that a web link has been accessed by a first device and record one or more resources of the web link and actions taken on the one or more resources of the web link and generate a score for the web link based on one or more similar web links to the web link and then displaying the score associated with the web link. Embodiments of the present invention can be used to generate a second score for the web link based on actions taken on the web link and an amount of accessed resources of the one or more resources of the web link and generate a display of the second score associated with the web link.

17 Claims, 4 Drawing Sheets

WEB LINK QUALITY ANALYSIS AND PREDICTION IN SOCIAL NETWORKS

BACKGROUND

The present invention relates generally to the field of social networking, and more particularly to web link quality analysis and prediction in social networks.

Generally speaking, social networking services are a platform to build relationships between people who share similar interests, activities, backgrounds, or real-life connections. For example, social network users can publish textual content, share pictures and videos, post microblogs, share and re-share content, and provide feedback on consumed content by posting comments or clicking on buttons designed to show positive affirmations (e.g., a "like" button). One popular form of publishing content is achieved by using web links within the content forms or documents. By sharing a web link, the user does not need to type or copy the content and the web link can point to anywhere and to any kind of resource on the Web.

SUMMARY

Embodiments of the present invention disclose a method, computer program product, and system for web link quality analysis. The method includes receiving a first indication that a web link has been accessed by a first device. The method further includes responsive to receiving the first indication, generating a first score for the web link based on one or more similar web links to the web link. The method further includes generating a display of the first score associated with the web link, wherein the display of the first score associated with the web link is generated as the web link is accessed, but before a webpage associated with the web link is loaded. The method further includes responsive to receiving a second indication from the generated display to proceed to the web link, recording one or more resources of the webpage and actions taken on the one or more resources of the webpage, wherein the one or more resources of the web link includes one or more embedded URLs within the webpage. The method further includes responsive to accessing the web link, generating a second score for the web link based on actions taken on the webpage and on an amount of accessed resources of the one or more resources of the webpage. The method further includes generating a display of the second score associated with the web link, wherein the display of the second score associated with the web link is generated as the web link is accessed, but before the webpage and resources of the webpage associated with the web link are loaded.

DETAILED DESCRIPTION

Figure 1:
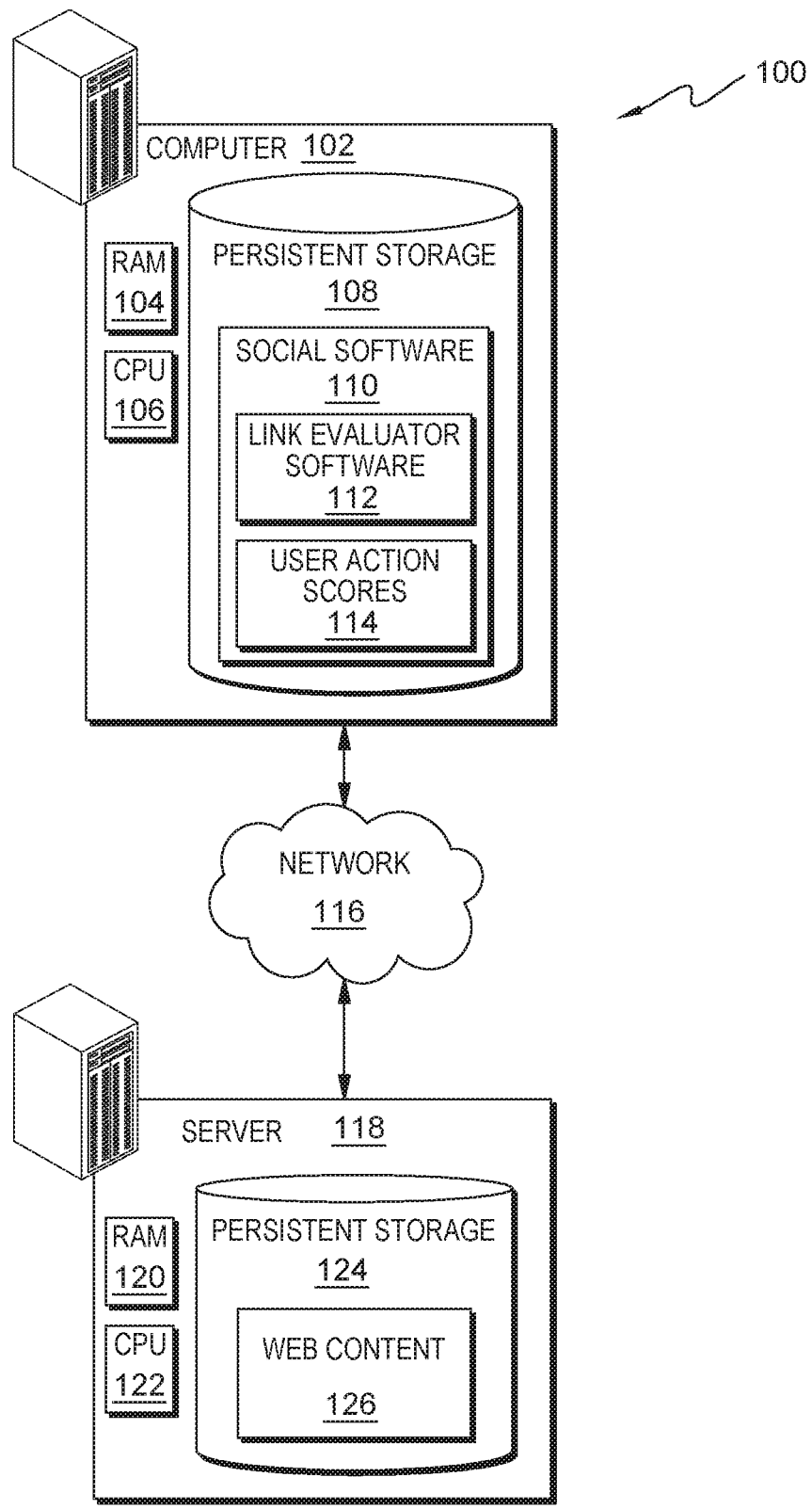
FIG. 1 is a functional block diagram illustrating a social networking environment, in an embodiment in accordance with the present invention.

Embodiments in accordance with the present invention recognize that web links in social networks can point to low quality content. For example, a web link can point to "clickbaits", that is, web content that is aimed at generating online advertising revenue at the expense of quality or accuracy. Generally, "clickbaits" rely on sensationalist headlines or eye-catching thumbnail pictures to attract users to click on the web link and encourage forwarding of the material over online social networks. Despite having techniques for basic link validation once the links are added to a web page (e.g., such as verification that the link is not returning HTTP errors), there is no solution which would predict that a link on a user's social network (e.g., "wall", newsfeed, or in some other web page, etc.) is worthy of the user's attention.

Embodiments of the present invention provide solutions that predict whether a shared link is valuable to the user, based, at least in part, on the number of previous users who have clicked on the link. Stated another way, embodiments of the present invention provide a mechanism for link evaluation and validation. For example, the quality of the web link that is published and accessible for a user can be evaluated with respect to the interests of the user, and users who have accessed the web link. In this manner, as discussed in greater detail later in this specification, embodiments of the present invention can analyze the behavior of other users that have "clicked" the web link to create a score that indicates whether the web link may be of value or interest to the current user.

For example, embodiments of the present invention can consider whether the web resource was fully loaded or interrupted in the evaluation. In instances where the resource is a video, the evaluation factors can include whether the video was loaded and whether the video was watched to completion. In instances where the resource is an audio file, the evaluation factors can include whether the audio was played and for how long. In another example embodiment, evaluation factors can include, but are not limited to, whether the web resource is a text file, image file, and/or a file that contains both text and images. In another example embodiment, evaluation factors can include how much time a user spent on the web page. For example, social software 110 and/or link evaluator 112 can track the length of time a user spends on a web page.

Additionally, social software 110 and/or link evaluator 112 can track the use of pointing device, such as a mouse with a scroll wheel. For example, social software 110 and/or link evaluator 112 can determine how far down the page a user has viewed by tracking the scroll wheel function of the mouse. Other factors that can be considered in the evaluation can include, but are not limited to: (i) the type of web content on the web page, (ii) how much time a user spent on the web page, (iii) how many times did the user replay the content (e.g., an audio and/or video file), and (iv) the user's mouse (pointing device) activity on the web page. The result of users' actions analysis will be a "link validity" score, also referred to as a "usefulness evaluation" score, or an "action" score, which can be presented to the user in a visual or normalized manner near the link, as embedded image or indicator. A link validity score is a measure of the value, or the likeliness of the web link being of interest to a user. In other example embodiments, the link validity score may also indicate a level of security to the user. For example, the link validity score may indicate how safe (e.g., phishing links that can result in a malware infection, a phishing scam, an invasion of online privacy, etc.), the link is for the user to click on.

Embodiments in accordance with the present invention will now be described in detail with reference to the Figures. FIG. 1 is a functional block diagram, generally designated 100, illustrating a social networking environment, in an embodiment in accordance with the present invention.

Social networking environment 100 includes computer 102, server 118, and other computing devices (not shown), all interconnected over a data connection to network 116. Computer 102 includes random access memory (RAM) 104, central processing unit (CPU) 106, and persistent storage 108. Computer 102 may be a Web server, or any other electronic device or computing system, capable of processing program instructions and receiving and sending data. In some embodiments, computer 102 may be a laptop computer, a tablet computer, a netbook computer, a personal computer (PC), a desktop computer, a personal digital assistant (PDA), a smart phone, or any programmable electronic device capable of communicating over a data connection to network 116. In other embodiments, computer 102 may represent server computing systems utilizing multiple computers as a server system, such as in a distributed computing environment. In general, computer 102 is representative of any electronic device or combinations of electronic devices capable of executing machine-readable program instructions and communicating with server 118 via network 116 and with various components and devices (not shown) within social networking environment 100.

Computer 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Computer 102 may include internal and external hardware components, as depicted and described in further detail with respect to FIG. 4.

Social software 110 is a computer program, or sets of computer programs, that is stored in persistent storage 108, and includes link evaluator 112 and user action scores 114. Social software 110 enables a user of computer 102 to build social networks and social relationships among individuals that share similar interests, activities, backgrounds, and/or real life connections (e.g., friend-based social networks, business social networks, etc.). In this example embodiment, social software 110, link evaluator 112, and user action scores 114 are reside on computer 102. In other example embodiments, such as a cloud computing environment, social software 110, link evaluator 112, and user action scores 114 may reside together in one or more computing devices, or individually on separate computing devices.

Link evaluator 112 is a computer program, or sets of computer programs, that collects user behavior patterns for web links that are published or shared within social networking environment 100. For example, when a user clicks on a web link to access a web resource, such as audio, video, image, textual, another web page, etc., link evaluator 112 records the resulting action from the access of the web link. Link evaluator 112 can then evaluate and assign a score for the action using the embedded web link of the web resource as a key to retrieve associated ratings for in user action scores 114. Link evaluator 112 can then determine whether the action can be considered as valuable to the user based on the collected user behavior patterns of previously recorded user behavior patterns. For example, when a user accesses a web link for a specific web page with embedded content, link evaluator 112 records the action of the user and evaluates the embedded web links within the specific web page and the corresponding actions that other users took on the embedded web links within the specific web page. Link evaluator 112 utilizes the collected user behavior patterns to generate an action score, then displays, or presents, the user with the action score based, at least in part, on aggregated and normalized web link validity score of previous users for the embedded web links within the specific web page. Further details of this process will be discussed with reference to FIG. 2.

User action scores 114 are a computer program, or sets of computer programs, and/or a repository that is used by link evaluator 112 to store one or more action scores of corresponding user actions, and the reference to the user who performed the action. Continuing the previous example, where a user accesses a web link for a specific web page with embedded content, link evaluator 112 stores the recorded user action of the user and the scores of the recorded user actions for selected, or accessed, web links in user action scores 114. User action scores 114 can also be used by social software 112 to extract corresponding actions of other users when determining the value of the embedded content in the specific web page. For example, upon displaying a web page to a user of computer 102, link evaluator 112 can determine one or more embedded web links within the displayed web page. For each embedded web link within the opened web page, link evaluator 112, using an embedded web link as a key, determines the associated user action scores of a plurality of users that have clicked on the embedded web link. For example, the URL of the embedded web link is a key (e.g., is the identifier), to identify similar web links and action scores associated with the similar web links. Upon retrieving the corresponding user action score, link evaluator 112 can display the corresponding user action score with the embedded web link on the opened web page. In other example embodiments, social software 110 and user action scores 114 may be components of an operating system software.

In FIG. 1, network 116 is shown as the interconnecting fabric between computer 102, server 118, and with various components and devices (not shown) within social networking environment 100. In practice, the connection may be any viable data transport network, such as, for example, a LAN or WAN. Network 116 can be for example, a local area network (LAN), a wide area network (WAN) such as the Internet, or a combination of the two, and include wired, wireless, or fiber optic connections. In general, network 116 can be any combination of connections and protocols that will support communications between computer 102, server 118, and with various components and devices (not shown) within social networking environment 100.

Server 118 is included in social networking environment 100 and can provide web content to computer 102. The web content can include, but is not limited to web pages, web resources such as audio and/or video files, or any file accessible over a data connection on network 116 within social networking environment 100. Server 118 includes random access memory (RAM) 120, central processing unit (CPU) 122, and persistent storage 124. Server 118 may be a Web server, or any other electronic device or computing system, capable of processing program instructions and receiving and sending data. In some embodiments, server 118 may be a laptop computer, a tablet computer, a netbook computer, a personal computer (PC), a desktop computer, a personal digital assistant (PDA), a smart phone, or any programmable electronic device capable of communicating over a data connection to network 116. In other embodiments, server 118 may represent server computing systems utilizing multiple computers as a server system, such as in a distributed computing environment. In general, server 118 is representative of any electronic devices or combinations of electronic devices capable of executing machine-readable program instructions and communicating with computer 102 via network 116 and with various components and devices (not shown) within social networking environment 100.

Server 118 further includes persistent storage 124. Persistent storage 124 may, for example, be a hard disk drive. Alternatively, or in addition to a magnetic hard disk drive, persistent storage 124 may include a solid state hard drive, a semiconductor storage device, read-only memory (ROM), erasable programmable read-only memory (EPROM), flash memory, or any other computer-readable storage medium that is capable of storing program instructions or digital information. Web content 126 is stored in persistent storage 124, in addition to operating system software (not shown), as well as software that enables server 118 to detect and establish a connection to computer 102, and communicate with other computing devices (not shown) of social networking environment 100 over a data connection on network 116.

In one example embodiment, web content 126 includes social networking services that are platforms that can be used to build social networks of social relations among individuals that share similar interests, activities, backgrounds, and/or real life connections (e.g., friend-based social networks, business social networks, etc.). In other example embodiments, such as a cloud computing environment, web content 126 may reside together in one or more computing devices, such as server 118, or individually on separate computing devices (not shown) of social networking environment 100.

Figure 2:
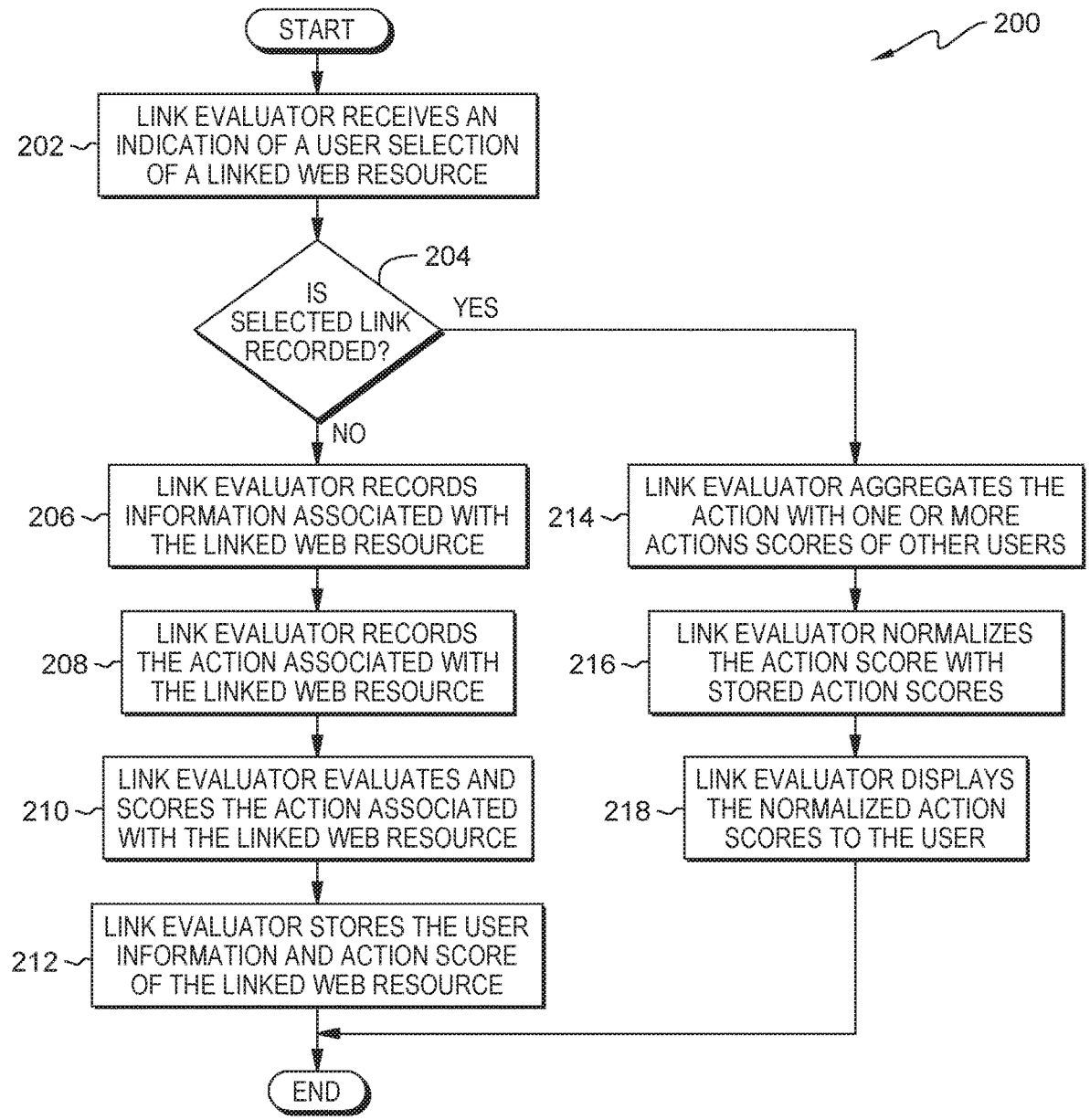
FIG. 2 is a flowchart depicting operational steps of a link evaluator software, on a computer system within the social networking environment of FIG. 1, for providing a web link evaluation and validation, in an embodiment in accordance with the present invention.

FIG. 2 is a flowchart, generally designated 200, depicting operational steps of a link evaluator software, on a computer system within the social networking environment of FIG. 1, for providing a web link evaluation and validation, in an embodiment in accordance with the present invention. In an example embodiment, a user of computer 102 uses social software 110 to access a web link to access a web recourse. For example, the web resource may be a web page with one or more embedded web links. In one example embodiment, the user of computer 102 may access the web resource by "clicking" on a web link with a mouse, also referred to as a pointing device. In other example embodiments, the user of computer 102 may access the web resource via a URL redirect after "clicking" on a previous web link. A URL redirect, also referred to as URL forwarding, is a World Wide Web technique for making a web page available under more than one URL address. When a web enabled application attempts to open a URL that has been redirected, a page with a different URL is opened. In general, the web resource may be accessed by any means known in the art.

Link evaluator 112 receives an indication of a user selection of a linked web resource as depicted in step 202. In this embodiment, link evaluator 112 receives an indication of a user selection from social software 110. For example, social software 110 is used by a user to access a web link. Social software 110 can transmit the indication of a user selection to link evaluator 112. In one example embodiment, link evaluator 112 may receive indications of a user selection of a linked web resource by other software applications executing on computer 102, or from software applications executing within social networking environment 100.

In decision step 204, link evaluator 112 determines if the selected link has been previously recorded. For example, link evaluator 112 determines if the selected link is recorded in user action scores 114 by using selected link Uniform Resource Locator (URL) as a key to identify and compare the selected link with previously stored links in user action scores 114. A URL, also referred to as a web address, is a reference to a web resource that specifies its location on a computer network and a mechanism for retrieving it. In other example embodiments, link URLs may refer to, but are not limited to, web resources referring to web pages (e.g., "http"), file transfer protocol (e.g., "ftp"), email (e.g., "mailto"), and/or database access (e.g., "JDBC"). Java database connectivity (JDBC) is an application programming interface (API) for the programming language Java that defines how a client may access a database. (Note: the terms "Java" and "JDBC" may be subject to trademark rights in various jurisdictions throughout the world and is used here only in reference to the products or services properly denominated by the marks to the extent that such trademark rights may exist). In this embodiment, previously visited web links are recorded and stored in user action scores 114 with associated user action scores of other users for the specific web link.

If link evaluator 112 determines that the selected link has not been previously recorded ("No" branch, decision step 204), link evaluator 112 records information associated with the linked web resource as depicted in step 206. For example, link evaluator 112 may record the selected link web address, and information pertaining to the user (e.g., a user profile). A user profile is a visual display of personal data associated with a specific user, or a customized desktop environment. Stated another way, a user profile refers to the explicit digital representation of a person's identity.

In step 208, link evaluator 112 records the action associated with the linked web resource. In this example embodiment, the action(s), also referred to as the immediate action(s), taken as a result of the web link click are recorded and stored in user action scores 114. For example, the immediate actions can be, but are not limited to, one of the following: (i) download and preview the file, (ii) open the web page referenced by the selected web link address, (iii) navigate to the link within the opened web page, (iv) open a referenced audio file, and (v) open a referenced video file. In the current example embodiment, link evaluator 112 records the selected web link and stores the selected web link in user action scores 114 as described further in step 212. In other example embodiments, immediate actions can be recorded by social software 110 or other software applications within social networking environment 100.

Link evaluator 112 evaluates and scores the action associated with the linked web resource as depicted in step 210. For example, link evaluator 112 can compare the resulting action with similar actions stored in user action scores 114 using the web link as a key to identify similarly related web links. If the same, or a similar, action is identified for the same or similarly related web links having action scores stored in user action scores 114, link evaluator 112 can use the score of the same, or a similar action to return, via a display, to the user prior to the web link the user has selected to access, loads. For example, link evaluator 112 may use "predetermined action scores" based on action scores of other users. A predetermined action score can also be referred to as a usefulness evaluation score, of other users stored on a computing device (not shown) within social networking environment 100.

In some instances, after accessing the web link for which the action score for the same or similar web links has been returned to a user, link evaluator 112 can then record actions taken by the user on the accessed web link. In one example embodiment, the web links can all point to a centralized location, where the users request are redirected to the actual URLs, thus allowing link evaluator 112 to count how many times each link was accessed. In another example embodiment, a client application or plugin can be installed on computer 102 that can analyze the user action with even higher granularity. The client application or plugin can check when the user watched the shared content, and whether the user viewed the audio/video content. For example, the client application or plugin at the central location can record user actions and then redirect the user (e.g., the user's accessed URL) to a different location. Link evaluator 112 can then aggregate the resulting action score (for which it has just evaluated with action scores of other user at the central location (e.g., the predetermined action scores) and then return to the user the aggregated action score for the web link the user is accessing. The aggregation of user action scores is described in further detail with respect to step 214.

In step 212, link evaluator 112 stores the user information and action score of the linked web resource. In the current example embodiment, upon evaluating and scoring the user action associated with the linked web resource, link evaluator 112 stores information pertaining to the user performing the action, and the action score of the clicked web link. For example, link evaluator 112 may store a reference to a user profile, the clicked web link and/or linked web resource, and the associated action score for the linked web resource in relation to the user or user profile in user action scores 114. In another example embodiment, link evaluator 112 may create keys using a combination of the selected URL with one or more additional attributes such as a user id, a date, a time of day, and/or a computer system identifier to identify similarly related web links. In other example embodiments, link evaluator 112 may store the user information and action scores in an external database or other computing device (not shown) within social networking environment 100.

If link evaluator 112 determines that the selected link has been previously recorded ("Yes" branch, decision 204), link evaluator 112 aggregates the action score generated for the linked web resource with one or more actions scores of other users as depicted in step 214. For example, link evaluator 112 can aggregate the resulting user action with one or more action scores stored in user action scores 114, wherein the one or more action scores are resulting user action scores of previous users of computer 102, or users of other computing devices within social networking environment 100. The aggregation, is also referred to as a summarization, or combination of the user's actions is necessary to create the cumulative score for every link. Positive actions from different users (e.g., viewing the entire content, sharing the link, etc.), results in a higher the aggregated action score. The aggregated score is different from the separate or average score of every user, some actions can be weighted more heavily than others. For example, a user's friends' actions can be scored 2 times more than the score of some other users that are not friends with the user.

Continuing with the current example embodiment, link evaluator 112 determines the selected link is recorded in user action scores 114 by using selected link URL as a key to identify actions or resources accessed by other users (e.g., the action scores of other users). For example, upon determining the selected link is recorded in user action scores 114, link evaluator 112 can calculate a sum of the action scores using the current action score of the selected web link and the previously recorded web links and action scores in user action scores 114, wherein a higher action score can indicate a higher value, or importance, to the user. For example, a higher value for an action score can indicate that the embedded web link can be of more interest to the user of computer 102 than a lower value action score.

In other example embodiments, link evaluator 112 may calculate an average for the user action scores of the selected web links and recorded web links with action scores in user action scores 114. For example, link evaluator 112 may calculate average values for the user action score to prevent the user for clicking on a web link for a malicious web site. For example, a web site that installs malicious software to redirect users to the malicious web site can inadvertently have a high user action value.

Link evaluator 112 can display the user action score for the embedded web link based on a predetermined factor that will display the average if the actual user action score meets a certain threshold. For example, positive actions can have positive weights, negative actions may have large negative weights. Aggregating number of user actions will show how many good actions are done. By normalizing the aggregated score, link evaluator 112 can determine if the link is good or not. Link evaluator 112 can then remove the malicious web link(s) from the pages, based on the link weight during the page loading, when the page structure can be analyzed before rendering the document (or page) into the presentable form.

Link evaluator 112 normalizes the action score with stored action scores as depicted in step 216. For example, link evaluator 112 can adjust the calculated user action scores on different scales to a specified common scale by a predetermined factor (e.g., user action score is multiplied by a factor of "0.1"). In general, link evaluator 112 may use any normalization technique known in the art to normalize the user action scores. Normalization of the action score brings the scores to a similar base. For example, for a certain link, where 100 users performed a share action, and a share action is 10 point, the total score will be 1000 points. However, for another link, 10 users performed a sharing action, resulting in a total score of 100. A score of 100 for the second link does not mean that the second link is 10 times worse that the first one. Normalization should eliminated the differences.

In step 218, link evaluator 112 displays the normalized action scores to the user. For example, link evaluator 112 may display the normalized action scores as part of the embedded URL of the linked web resource. Any embedded URLs of the now opened web page would have an associated normalized user action score as part of the URL. For example, a number may precede the URL on the web page. In another example embodiment, the link evaluator 112 may display the normalized user action scores when a user uses a pointing device of computer 102, or points with a finger in the case of a touch screen, to point to or hover on the embedded URL. In yet another example embodiment, the normalized action scores can be displayed to the user by loading a separate confirmation web page that displays the normalized action scores and requests the user to take action.

For example, the user may click a "proceed" button to access the web page, or click a "cancel" button to go back to the previous web page.

Figure 3:
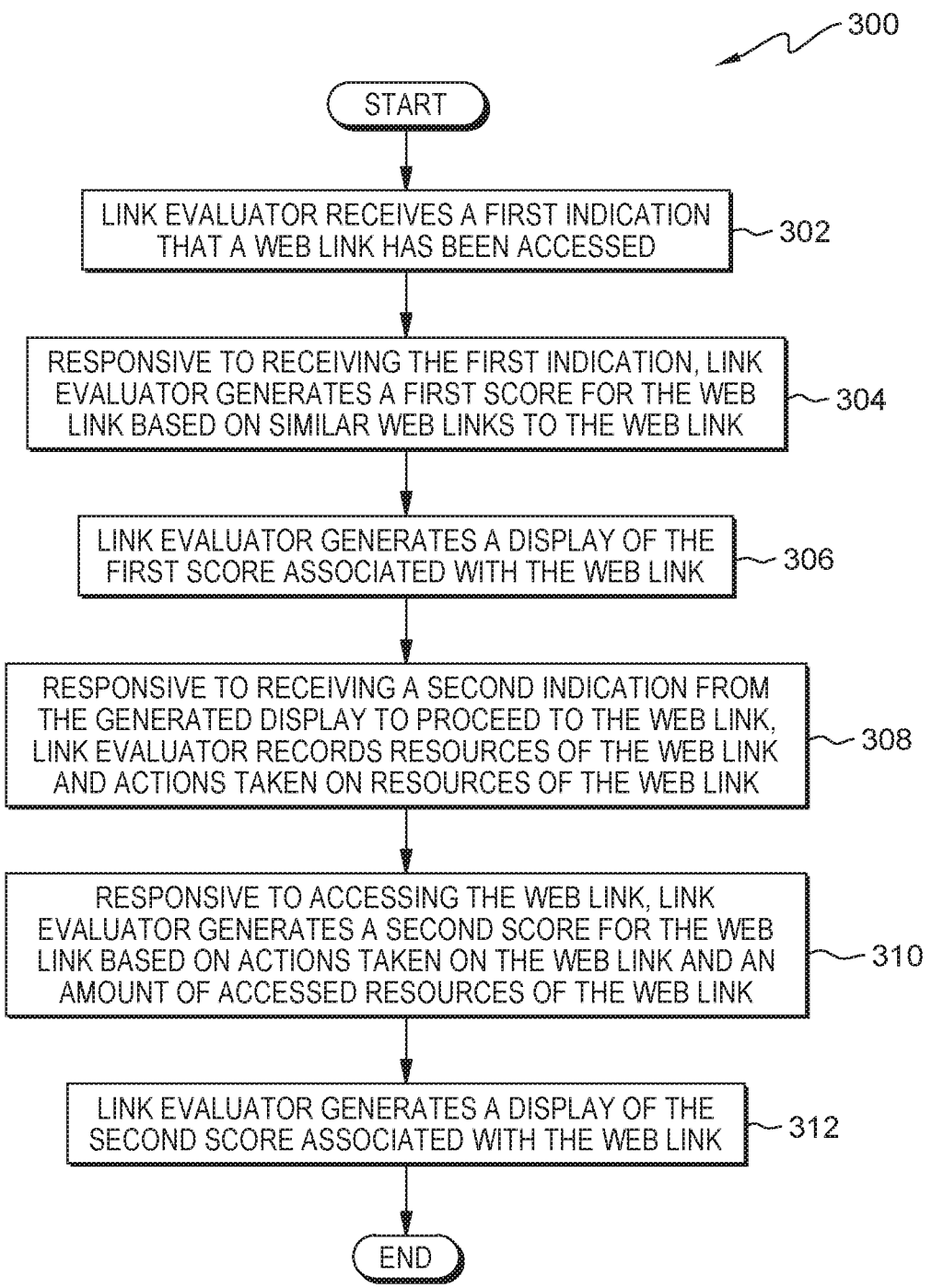
FIG. 3 is a flowchart depicting operational steps of a link evaluator software, on a computer system within the social networking environment of FIG. 1, in an embodiment in accordance with the present invention.

FIG. 3 is a flowchart, generally designated 300, depicting operational steps of a link evaluator software, on a computer system within social networking environment 100 of FIG. 1, in an embodiment in accordance with the present invention. In an example embodiment, a user of computer 102 accesses a web link containing one or more resources for a first time, wherein the one or more resources can include one or more embedded web links, audio files, video files, documents, and/or images.

Link evaluator 112 receives a first indication that a web link has been accessed as depicted in step 302. In this embodiment, upon accessing the web link, link evaluator 112 can receive an indication from social software 110 that performed an action on the web link. For example, link evaluator 112 determines the user has "clicked" on the web link. In other example embodiments, link evaluator 112 can receive an indication that a user "hovers over", or "points to" a particular web link using social software 110.

In step 304, responsive to receiving the first indication, link evaluator 112 generates a first score for the web link based on similar web links to the web link. For example, link evaluator 112 accesses user action scores 114 to determine whether previous actions taken on the web link by other users. For example, link evaluator 112 can determine the previous actions taken on the web link, or similar web links, such as whether or not previous users played a video file. Link evaluator 112 can also determine how much of the video was watched, or what parts were of interest to the user. Link evaluator 112 aggregates action scores associated with similar web links of other users at a central location. In this example embodiment, the user is accessing the link for the first time, therefore link evaluator 112 aggregates the scores of similar web links with the web link being accessed for the first time.

Link evaluator 112 generates a display of the first score (i.e., action score), associated with the web link as depicted in step 306. For example, link evaluator 112 displays the web link with the associated URL. In one example embodiment, link evaluator 112 appends the first score to the front of the URL. In another example embodiment, link evaluator 112 displays the first score in a pop-up box when the user hovers over the URL. In other example embodiments, link evaluator 112 displays the first score in a confirmation dialog window.

In step 308, responsive to receiving a second indication from the generated display to proceed to the web link, link evaluator 112 records resources of the web link and actions taken on resources of the web link. Link evaluator 112 receives a second indication from the generated and displayed web page of the web link to proceed to the "clicked" URL. For example, the user can "refresh" the previous web link, or access it for a second time. In another example, a second user can access the web link that the first user previously accessed.

In this embodiment, link evaluator 112 records the resources on the page of the web link and the one or more possible actions for the web link. As mentioned earlier, examples, of actions be, but are not limited to, one of the following: (i) download and preview the file, (ii) open the web page referenced by the selected web link address, (iii) navigate to the link within the opened web page, (iv) open a referenced audio file, and (v) open a referenced video file.

Responsive to accessing the web link, link evaluator 112 generates a second score for the web link based on actions taken on the web link and an amount of accessed resources of the web link as depicted in step 310. For example, link evaluator 112 accesses the recorded actions scores at the central location and determines a level of interest of the web link based on one or more similar web links, or previous recorded accesses to the accessed web link. Link evaluator 112 then can aggregate and normalize the action score for the web link with the one or more similar web links, or previous recorded accesses to the accessed web link, to create the second score.

In step 312, link evaluator 112 generates a display of the second score associated with the web link. For example, link evaluator 112 displays the web link with second score of the associated URL appended to the front of the URL, or in a pop-up box when the user hovers over the URL. In other example embodiments, a user can configure how the generated score is displayed on the generated web page through configuration settings of social software 110 or through a system settings user interface of computer 102.

Figure 4:
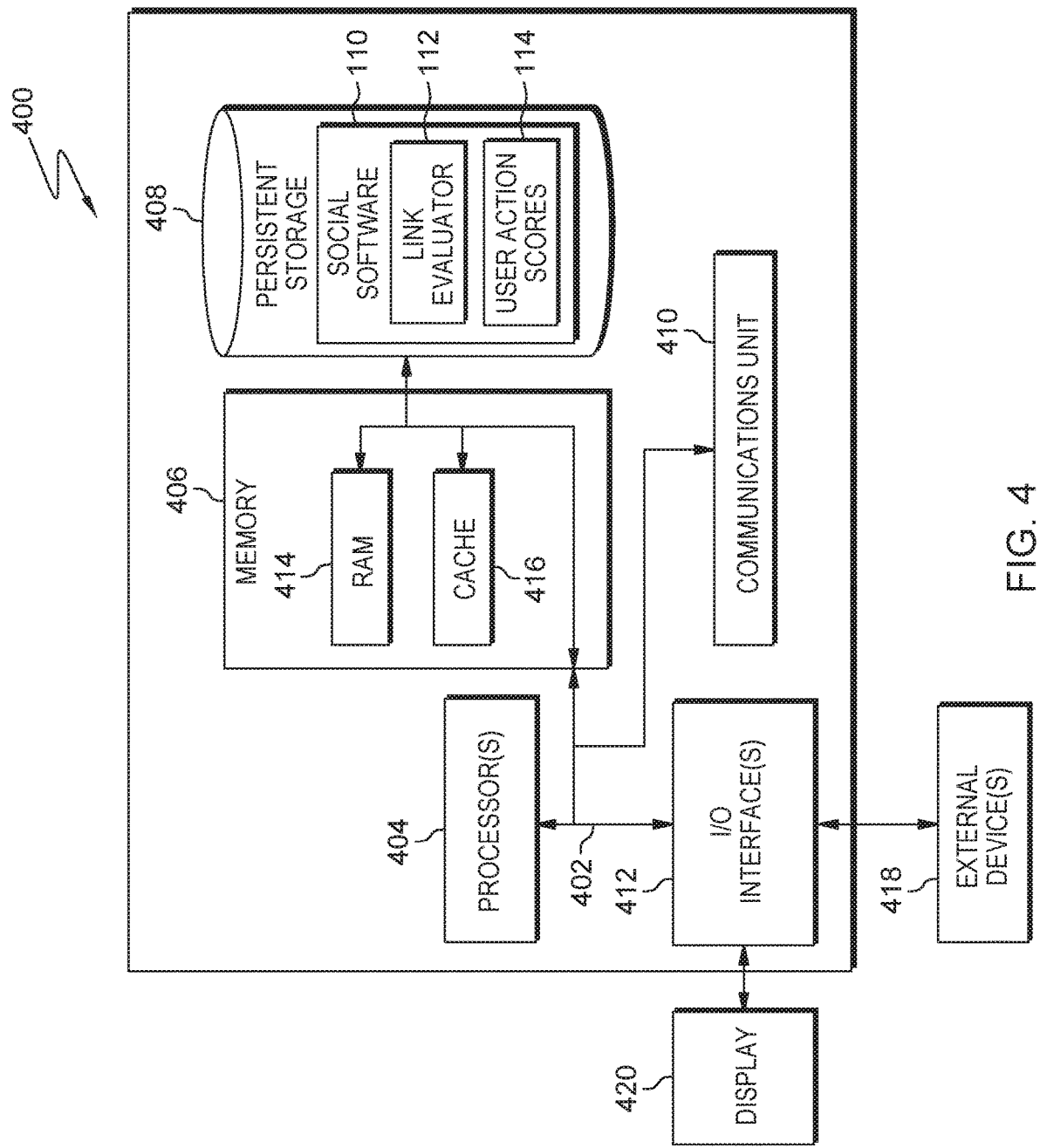
FIG. 4 depicts a block diagram of components of the computer system executing the link evaluator software, in an embodiment in accordance with the present invention.

FIG. 4 depicts a block diagram, generally designated 400, of components of the computer system executing the link evaluator software, in an embodiment in accordance with the present invention. It should be appreciated that FIG. 4 provides only an illustration of one implementation and does not imply any limitations with regard to the environments in which different embodiments may be implemented. Many modifications to the depicted environment may be made.

Computer 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Social software 110, link evaluator 112, and user action scores 114 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of network 116 and server 118. In these examples, communications unit 410 includes one or more network interface cards. Communications unit 410 may provide communications through the use of either or both physical and wireless communications links. Social software 110, link evaluator 112, and user action scores 114 may be downloaded to persistent storage 408 through communications unit 410.

I/O interface(s) 412 allows for input and output of data with other devices that may be connected to computer 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., social software 110, link evaluator 112, and user action scores 114, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

A "data communication" includes, but is not necessarily limited to, any sort of data communication scheme now known or to be developed in the future. "Data communications" include, but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

What is claimed is:

1. A computer-implemented method comprising:
receiving, by one or more computer processors, a first indication that a web link has been accessed by a first device;
responsive to receiving the first indication, generating, by one or more computer processors, a first score for the web link based on one or more similar web links to the web link;
generating, by one or more computer processors, a display of the first score for the web link, wherein the display of the first score for the web link is included on a first confirmation webpage that the first device navigates to in response to accessing the web link;
responsive to receiving a second indication from the generated display to proceed to a webpage associated with the web link, and responsive to the first device navigating to the webpage, recording, by one or more computer processors, one or more and actions taken by the first device on the webpage, wherein the one or more actions include selecting one or more URLs embedded within the webpage;
generating, by one or more computer processors, a second score for the web link based on actions taken on the webpage by the first device;
receiving, by one or more computer processors, a third indication that the web link has been accessed by a second device; and
responsive to receiving the third indication, generating, by one or more computer processors, a display of the second score for the web link, wherein the display of the second score for the web link is included on a confirmation webpage that the second device navigates to in response to accessing the web link.

2. The computer-implemented method of claim 1, further comprising:
storing, by one or more computer processors, the second score for the web link.

3. The computer-implemented method of claim 2, further comprising:
generating, by one or more computer processors, a third score for the web link based on actions taken on the webpage by the second device;
aggregating, by one or more computer processors, the second score for the web link and the third score for the web link to produce an aggregated score for the web link; and
normalizing, by one or more computer processors, the aggregated score for the web link.

4. The computer-implemented method of claim 3, further comprising:
generating, by one or more computer processors, a display of the aggregated score for the web link, wherein the display of the aggregated score for the web link is included on a confirmation web page that a third device navigates to in response to accessing the web link.

5. The computer-implemented method of claim 1, wherein the actions taken by the first device on the webpage further include:
opening a referenced audio or video file.

6. The computer-implemented method of claim 1, wherein generating a first score for the web link based on one or more similar web links to the web link comprises:
generating one or more usefulness evaluations for the one or more similar web links based on actions taken on one or more similar web links;
calculating a sum of the one or more usefulness evaluations of the one or more similar web links to generate the first score for the web link.

7. A computer program product comprising:
one or more computer readable storage media and program instructions stored on the one or more computer readable storage media, the stored program instructions comprising:
program instructions to receive a first indication that a web link has been accessed by a first device;
program instructions to, responsive to receiving the first indication, generate a first score for the web link based on one or more similar web links to the web link;
program instructions to generate a display of the first score for the web link, wherein the display of the first score for the web link is included on a first confirmation webpage that the first device navigates to in response to accessing the web link;
program instructions to, responsive to receiving a second indication from the generated display to proceed to a webpage associated with the web link, and responsive to the first device navigating to the webpage, record one or more actions taken by the first device on the webpage, wherein the one or more actions include selecting one or more URLs embedded within the webpage;
program instructions to generate a second score for the web link based on actions taken on the webpage by the first device;
program instructions to receive a third indication that the web link has been accessed by a second device; and
program instructions to, responsive to receiving the third indication, generate a display of the second score for the web link, wherein the display of the second score the web link is included on a confirmation webpage that the second device navigates to in response to accessing the web link.

8. The computer program product of claim 7, the stored program instructions further comprising:
program instructions to store the second score for the web link.

9. The computer program product of claim 8, the stored program instructions further comprising:
program instructions to generate a third score for the web link based on actions taken on the webpage by the second device;
program instructions to aggregate the second score for the web link and the third score for the web link to produce an aggregated score for the web link; and
program instructions to normalize the aggregated score for the web link.

10. The computer program product of claim 9, the stored program instructions further comprising:
program instructions to generate a display of the aggregated score for the web link, wherein the display of the aggregated score for the web link is included on a confirmation web page that a third device navigates to in response to accessing the web link.

11. The computer program product of claim 7, wherein the actions taken by the first device on the webpage further include:
opening a referenced audio or video file.

12. The computer program product of claim 7, wherein the program instructions to generate a first score for the web link based on one or more similar web links to the web link comprise:
program instructions to generate one or more usefulness evaluations for the one or more similar web links based on actions taken on one or more similar web links and
program instructions to calculate a sum of the one or more usefulness evaluations of the one or more similar web links to generate the first score for the web link.

13. A computer system comprising:
one or more computer processors;
one or more computer readable storage media;
program instructions stored on the computer readable storage media for execution by at least one of the one or more processors, the stored program instructions comprising:
program instructions to receive a first indication that a web link has been accessed by a first device;
program instructions to, responsive to receiving the first indication, generate a first score for the web link based on one or more similar web links to the web link;
program instructions to generate a display of the first score for the web link, wherein the display of the first score for the web link is included on a first confirmation webpage that the first device navigates to in response to accessing the web link;
program instructions to, responsive to receiving a second indication from the generated display to proceed to a webpage associated with the web link, and responsive to the first device navigating to the webpage, record one or more actions taken by the first device on the webpage, wherein the one or more actions include selecting one or more URLs embedded within the webpage;

program instructions to generate a second score for the web link based on actions taken on the webpage by the first device;

program instructions to receive a third indication that the web link has been accessed by a second device; and program instructions to, responsive to receiving the third indication, generate a display of the second score for the web link, wherein the display of the second score for the web link is included on a confirmation webpage that the second device navigates to in response to accessing the web link.

14. The computer system of claim 13, the stored program instructions further comprising:

program instructions to store the second score for the web link.

15. The computer system of claim 14, the stored program instructions further comprising:

program instructions to generate a third score for the web link based on actions taken on the webpage by the second device;

program instructions to aggregate the second score for the web link and the third score for the web link to produce an aggregated score for the web link; and program instructions to normalize the aggregated score for the web link.

16. The computer system of claim 15, the stored program instructions further comprising:

program instructions to generate a display of the aggregated score for the web link, wherein the display of the aggregated score for the web link is included on a confirmation web page that a third device navigates to in response to accessing the web link.

17. The computer system of claim 13, wherein the program instructions to generate a first score for the web link based on one or more similar web links to the web link comprise:

program instructions to generate one or more usefulness evaluations for the one or more similar web links based on actions taken on one or more similar web links and program instructions to calculate a sum of the one or more usefulness evaluations of the one or more similar web links to generate the first score for the web link.

* * * * *